United States Patent Office 2,833,391
Patented May 6, 1958

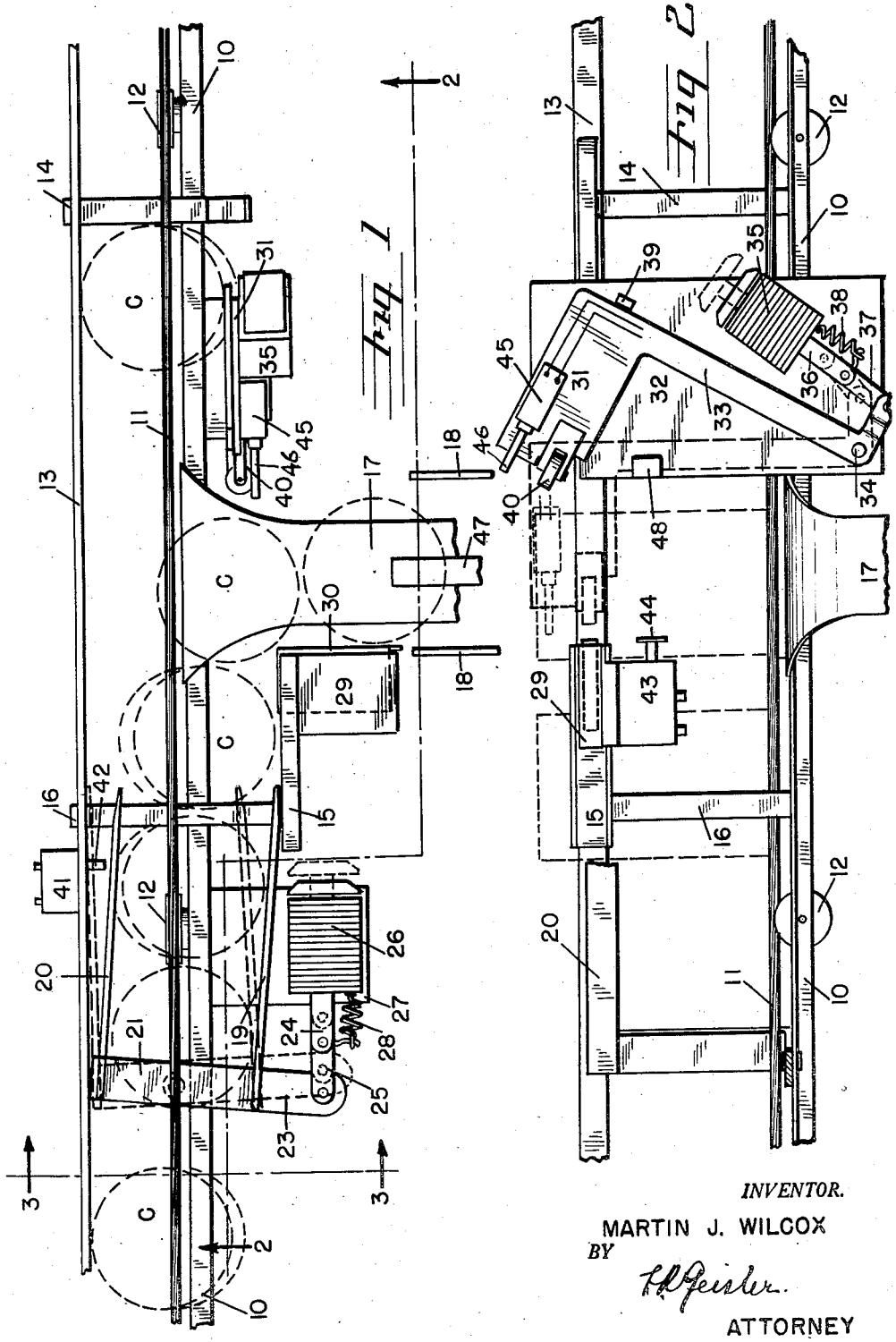

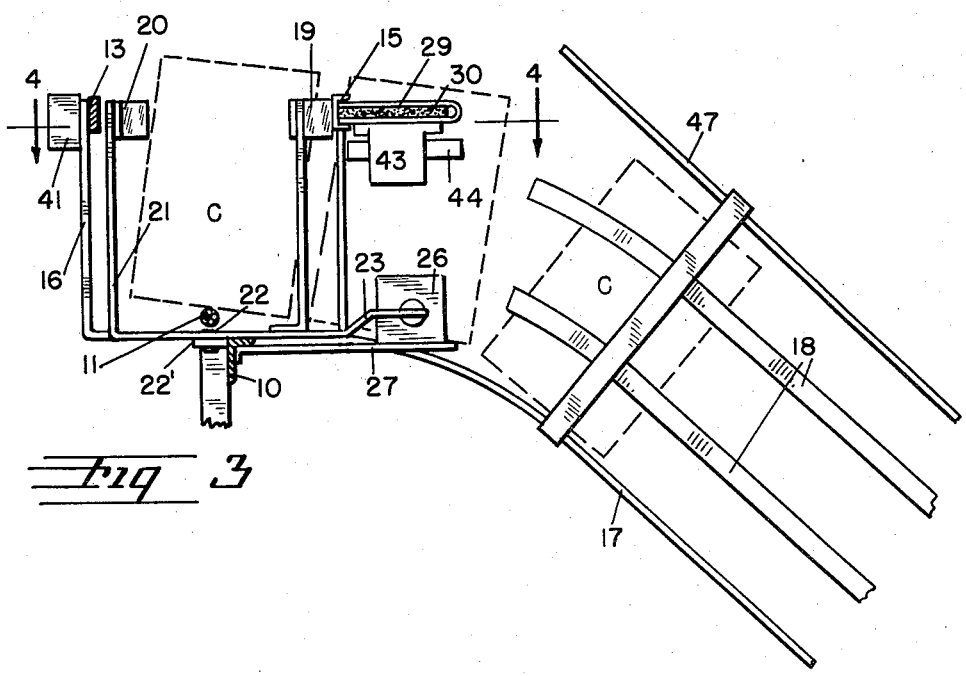
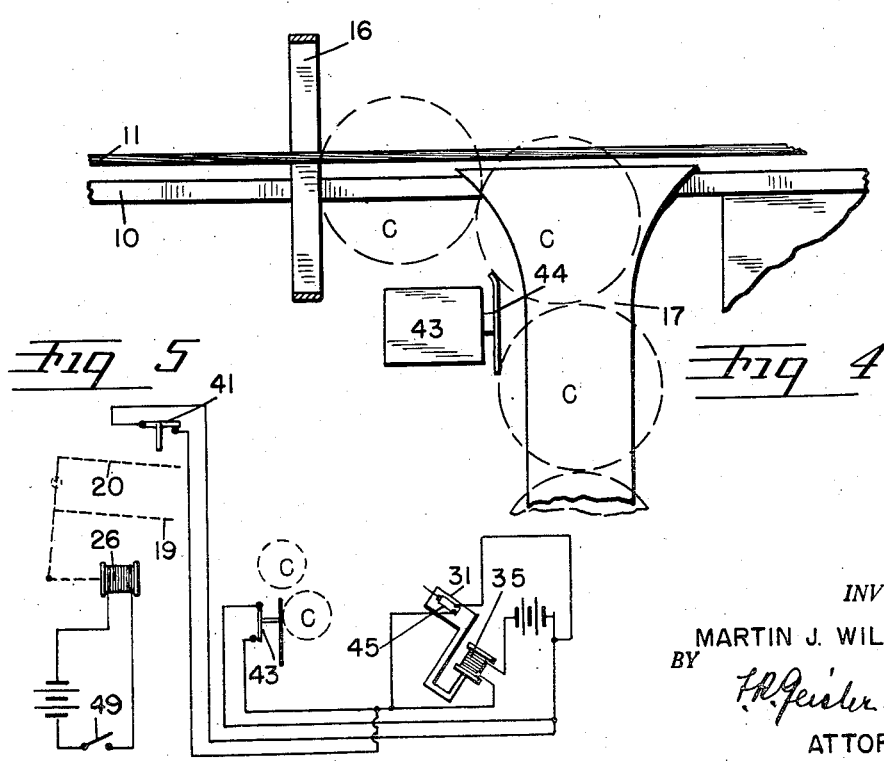

2,833,391

CONVEYOR DIVERTER

Martin J. Wilcox, Portland, Oreg.

Application January 26, 1956, Serial No. 561,565

7 Claims. (Cl. 198—31)

The present invention relates to conveyors for containers, particularly conveyors for cans, and is concerned with special means for diverting some of the containers or cans from the conveyor as desired at a particular station along the conveyor.

This application is a continuation-in-part of my pending application Serial No. 483,877, filed under date of January 25, 1955, now Patent No. 2,766,739, and entitled Diverting Means for Conveyor System.

The object of the present invention is to provide further improved means for diverting cans from a more or less standard type of conveyor which diverting means will enable the operator to divert the cans as desired merely by operating a simple control such as a push button switch.

An additional object of the invention is to provide a can diverting assembly which will function satisfactorily in combination with a simple conveyor regardless of the speed at which the cans are being moved along the conveyor, and which diverting assembly will be equipped with means automatically functioning as a safeguard to prevent any blocking of a procession of cans on a rapidly moving conveyor due to failure of any individual can to be entirely diverted in the allotted time or due to any tendency of a successive can to become diverted when not desired.

In the drawings, which are more or less diagrammatic;

Figure 1 is a plan view of a portion of a conveyor system showing the improved diverting assembly installed thereon;

Figure 2 is a sectional elevation of the same taken on line 2—2 of Figure 1;

Figure 3 is a transverse sectional elevation taken on line 3—3 of Figure 1;

Figure 4 is a fragmentary plan section taken on line 4—4 of Figure 3; and

Figure 5 is a wiring diagram.

The conveyor, as indicated in the drawings, is a simple form of conveyor commonly used in canneries and employed especially for empty cans, and the conveyor includes a main longitudinally-extending frame member 10, supported at intervals by suitable means (not shown) and in turn supporting the pulleys 12 on which an endless conveyor cable 11 moves. A guide rail 13 extends continuously along one side of the conveyor above and to one side of the cable 11, and the cans C, indicated in broken lines in the figures, rest on the moving cable 11 and lean to one side against the guide rail 13 in their normal travel along the conveyor. Brackets 14, secured to the longitudinal member 10, support the guide rail 13.

At a location where it is desired to arrange to have some of the cans diverted from the conveyor a slide 17 is attached to the frame member 10 and slopes downwardly therefrom on the side of the conveyor opposite the continuous guide rail 13. This slide 17 has sufficient slope so that a can, when placed on the slide and removed from the conveyor cable 11 would ordinarily move rapidly down the slide by gravity.

A short second rail 15 is positioned on the conveyor on the opposite side from the continuous rail 13. This short rail 15 is supported by a bracket 16 and this rail is positioned at approximately the same height as the opposite continuous rail 13. This rail 15 terminates approximately where the slide 17 leads off from the conveyor, as shown in Figure 1. A stationary permanent magnet 30 is supported in a housing 29 which is attached to the outer face of the rail 15 at the end of the rail.

A can-shifting means, adapted to enable cans to be shifted from the continuous rail 13 over to the short rail 15, is mounted on the conveyor beginning a short distance ahead of short rail 15. This can-shifting means includes a pair of substantially parallel horizontal bars 19 and 20 (Figure 1) which are spaced apart a distance slightly greater than the width or diameter of the cans which are being carried by the conveyor. The pair of bars 19 and 20 are rigidly secured to a frame assembly indicated by the reference character 21 which, in turn, is pivotally mounted by the pivot mounting 22 on a short bracket 22' attached to the main frame member 10 (see also Figure 3) to enable the can-shifting means to be given a limited horizontal swing. Normally this can-shifting means occupies the broken line position shown in Figure 1 and in such position does not cause any shifting of the cans away from the continuous rail 13 as the cans pass between the bars 19 and 20 in their travel on the conveyor. However, the moving of the can-shifting means into the full line position shown in Figure 1 then causes the cans passing between the bars 19 and 20 to be shifted from the rail 13 over against the short rail 15.

A side arm 23 (Figures 1 and 3) of the can-shifting frame is connected by a link 25 to a rod 24 which constitutes the movable core of a stationary solenoid 26. The solenoid 26 is supported on a plate 27 attached to the frame member 10. A spring 28 normally maintains the core rod 24 in the broken line position indicated in Figure 1, thus holding the can shifting means in the normal position, but enables the core rod to move to the left (as viewed in Figure 1) when the solenoid 26 is activated by the closing of the circuit to the solenoid. In this way the closing of the circuit to solenoid 26 operates to swing the can-shifting means from normal position to the full line position shown in Figure 1, and thus temporarily results in the can or cans passing between the bars 19 and 20 being shifted over into engagement with the short rail 15. When a can is so shifted the can then moves along this short rail 15 until it comes into contact with the magnet 30.

When a can on the conveyor is thus brought into contact with the stationary magnet 30 as it continues to move with the conveyor cable, the attraction exerted on the can by the magnet is sufficient to halt further forward travel of the can with the conveyor cable 11. As a result, the can makes a partial turn (in clockwise direction, as viewed in Figure 1) and slides off from the cable while still being held by the magnet. The rotational movement imparted in this manner to the can and the can momentum will cause the can to move down on the slide 17. If the conveyor cable 11 is moving with considerable speed the can will continue moving downwardly on the slide 17 and free itself from the magnet in so doing. However, should the can fail to continue to move on down the slide past the magnet, then the next can, upon being brought forcibly against the first can, will provide the necessary additional thrust to cause the first can to continue its descent along the slide 17.

The slide 17 is provided with pairs of guide rails 18 on both sides and also with a top guide member 47 to prevent any possibility that the cans which are rapidly delivered onto the slide 17 will be pushed off the slide before reaching the bottom of the same.

In order to prevent the possibility that any congestion or blocking of successive cans should occur at the top of the slide 17, due to excessive speed of the conveyor or to any other causes, and also to prevent any can which, as a result of such congestion might have inadvertently been brought into contact with the magnet from being pushed down the slide 17 when the diverting of such can from the conveyor is not desired, a gate 31 (Figure 2) is provided and, when it is in closed position, this gate shuts off the slide from the conveyor and prevents any can from starting down the slide. This gate 31 is shaped preferably as shown in Figure 2, having an integral, downwardly-extending L-shaped arm 33. The gate is pivotally mounted at 34 for swinging in a vertical plane and is supported on the vertical portion of a bracket 32, the inner bottom end of this bracket being secured to the main frame member 10 of the conveyor.

A solenoid 35 (Figure 2) is also mounted on the outer vertical portion of the bracket 32 and this solenoid 35 is so arranged as to operate rod 36, constituting the movable core of the solenoid, which rod is connected by means of a link 37 with the end of the L-shaped arm 33 of the gate 31. A spring 38 normally holds the core rod 36 in the raised broken line position indicated in Figure 2 and thus acts to hold the gate 31 normally in the closed position also indicated by broken lines. This solenoid assembly is so arranged that the closing of the circuit to solenoid 35 will cause the core rod 36 to be thrust downwardly against the force of spring 38 and thus swing the gate 31 to the open full line position. A stop 39 is provided on the bracket 32 to limit the extent to which the gate swings when being opened and a stop 48 is similarly provided on the bracket 32 to limit the extent to which the gate swings when the gate returns to normal closed position.

Since the gate 31 under some circumstances might strike against a can when returning to normal closed position, the gate is preferably provided on its edge with a contact wheel 40 which will then enable the gate, upon contacting a can, to thrust the can a short distance up or down without injuring the can and thus permit the gate to return to the desired normal or closed position. The gate also carries a microswitch 45 which is normally open, but which will be closed by slight pressure on the contact element 46, as would occur if the gate strikes against a can on the slide 17. The microswitch 45 is connected in the circuit of the solenoid 35 so that the temporary closing of microswitch 45 would actuate the solenoid 35 and cause the gate 31 momentarily to swing back to open position. The control system by which the gate is automatically operated and thus the control for the circuit to the solenoid 35 will be presently described.

A spring-operated switch 41 is mounted in a housing attached to the outside of the side rail 13 (see Figures 1 and 3). This switch 41 has an engageable member 42 which is so arranged as to be engaged by the bar 20 of the can-shifting means when the can-shifting means is in the normal broken line position shown in Figure 1, and when the member 42 is so engaged the switch 41 is held in open position. However, the moving of the can-shifting means to diverting position automatically causes the switch 41 to be closed.

A microswitch 43 is mounted in a housing attached to the underside of housing 29 (Figures 2, 3 and 4). This microswitch is normally open but will be closed by slight pressure against an actuating element 44. The actuating element 44 is so arranged and positioned that a can on the upper end of the slide 17 in contact with the stationary magnet 30 will press against the element 44 and thus close switch 43.

The solenoid 26, the switch 41 and the solenoid 35 have their circuits so arranged and connected that the closing of the circuit to solenoid 26, causes the can-shifting means to be moved to the full line diverting position of Figure 1, which in turn, with the moving of the bar 20 away from the member 42 of switch 41, causes the spring-actuated switch 41 to close. The switch 41, in turn, is connected in the circuit to the solenoid 35 so that the closing of switch 41 closes the circuit to solenoid 35 and results in the opening of the gate 31.

Referring to the diagram in Figure 5, the circuit to solenoid 26 is controlled by a switch 49, which may be a push button switch or any other type of switch suitable for being operated manually by the operator whenever the operator desires to divert one or more cans from the conveyor. Thus, as previously explained, the closing of the circuit to solenoid 26 by the switch 49 results in operating the can-shifting means and also in opening the gate 31. In other words, when the operator closes the control switch 49 the can-shifting arms 19 and 20 are moved to the full line position of Figure 1, while the gate 31 opens. Each can then passing between the arms 19 and 20 will be shifted over to the short rail 15 and there come into contact with the magnet 30 and, as a result, be turned onto the slide 17 and through the open gate 31.

When the desired number of cans have been diverted from the conveyor in this manner the operator reopens the switch 49. The spring 28 (Figure 1) then returns the core rod 24 to normal position, causing the can-shifting means to return to the normal position indicated by the broken lines in Figure 1. The switch 41 opens and opens the circuit to solenoid 35 and the spring 38 (Figure 2) returns the core rod 36 to normal position and returns the gate 31 to normal closed position.

It could happen that the closing of the gate 31 would take place too quickly for allowing a can, the diverting of which is desired by the operator, to pass through the gate 31. This would be quite possible particularly if the conveyor happened to be running slowly. To prevent such a situation I provide the microswitch 43 to serve the purpose of temporarily holding the circuit to the solenoid 35 closed and thus temporarily holding the gate 31 open, even though the can-shifting means has returned to normal position and opened the switch 41 in the circuit to solenoid 35. It will be noted from Figure 5 that the closing of the microswitch 43 will operate temporarily to close the circuit to solenoid 35 and thus result in holding the gate 31 open as long as this switch 43 remains closed, and thus as long as a can on the slide 17 remains in contact with the magnet.

If the gate 31, when returning to closed position, should strike against a can starting down the slide 17, the pressure on the contact element 46 of microswitch 45 would temporarily close switch 45. From Figure 5 it will be noted that the closing of switch 45 will also temporarily close the circuit to solenoid 35 and thus result in the swinging of the gate momentarily to open position and thus give the can on the slide 17 a chance to move down the slide before the gate 31 swings back to normal closed position.

Thus, the diverting of one or more cans onto the slide 17 from the conveyor is accomplished as and when desired by the operator merely by closing the control switch 45. The diverting of the cans will continue as long as the switch is kept closed and will discontinue when the switch is returned to open position. Any undesired diverting of the cans and any congestion of cans on the conveyor at the top of the slide will be prevented or remedied by the closing of the gate 31, and the operator can cause the gate to close at any time by opening the control switch 45 unless a can momentarily happens to have started its travel down the slide 17, in which case the gate 31 will delay closing until such can has passed beyond the gate and the magnet.

I claim:

1. In combination with a conveyor assembly for conveying cans and the like, a downwardly inclined slide leading off from said conveyor assembly, selectively operable means for directing a desired can moving along said conveyor assembly from said conveyor onto said slide, a gate positioned near the top of said slide to prevent a can on said conveyor from moving off of said conveyor and down said slide when said gate is closed, means normally holding said gate closed, and means operated by said first mentioned can directing means for opening said gate whenever said first mentioned can directing means is selectively operated.

2. In combination with a conveyor of the character described for conveying cans and the like, a downwardly inclined slide leading off from one side along said conveyor assembly, selectively operable means for directing a desired can moving along said conveyor assembly from said conveyor onto said slide, a gate positioned near the top of said slide to prevent a can on said conveyor from moving off of said conveyor and down said slide when said gate is closed, means normally holding said gate closed, solenoid operated mechanism for opening said gate when said solenoid is energized, and a control circuit and switch for said solenoid operated by said first mentioned can directing means so as to cause said control circuit and switch to be closed and said solenoid to be energized whenever said first mentioned can directing means is operated.

3. The combination set forth in claim 2, together with an additional circuit and control switch for said solenoid, said additional control switch mounted on said gate, and a contact element for said additional control switch extending from the end of said gate so as to contact a can and close said additional control switch should said gate attempt to close against a can on said slide.

4. In combination with a conveyor assembly for conveying metal objects susceptible to attraction by a magnet, a slide leading off from one side along said conveyor assembly, a stationary magnetic element located above said side of said conveyor adjacent said slide, said magnetic element being capable of exerting sufficient attraction, when contacted by one of said objects on said conveyor assembly to halt the forward movement of said object, selectively operable means for directing a desired object moving along said conveyor assembly into contact with said magnetic element as said object approcahes the top of said slide, a gate positioned near the top of said slide to prevent an object on said conveyor from moving off of said conveyor and down said slide when said gate is closed, spring means normally holding said gate closed, solenoid operated mechanism for opening said gate when said solenoid is energized, and a control circuit and switch for said solenoid operated by said first mentioned directing means so as to cause said control circuit and switch to be closed and said solenoid to be energized whenever said first mentioned directing means is operated.

5. In combination with a conveyor of the character described for conveying cans and the like, a downwardly inclined slide leading off from one side along said conveyor, a stationary magnet located above said side of said conveyor adjacent the top of said slide, said magnet being capable of exerting sufficient attraction, when contacted by a can on said conveyor assembly to halt the forward movement of said can, selectively operable means for directing a desired can moving along said conveyor into contact with said magnet as said can approaches the top of said slide, whereby said magnet, by restraining a contacted can from further travel along said conveyor, will cause the contacted can to be turned onto said slide, a gate positioned near the top of said slide to prevent a can on said conveyor from moving off of said conveyor and down said slide when said gate is closed, means normally holding said gate closed, solenoid operated mechanism for opening said gate when said solenoid is energized, a control circuit and switch for said solenoid operated by said first mentioned can directing means so as to cause said control circuit and switch to be closed and said solenoid to be energized whenever said first mentioned can directing means is operated, an additional circuit and control switch for said solenoid, said additional control switch mounted on said gate, and a contact element for said additional control switch extending from the end of said gate so as to contact a can and close said additional control switch should said gate attempt to close against a can on said slide.

6. In combination with a conveyor assembly of the character described for conveying cans and the like and having a guide rail extending along and above one side of said conveyor, a can slide leading off from the opposite side along said conveyor, a guide rail located above and on said opposite side of said conveyor and terminating at said slide, a magnet located at the termination of said latter mentioned guide rail, said magnet being capable of exerting sufficient attraction when contacted by a can on said conveyor to halt the forward movement of said can, means for directing a can from said first mentioned guide rail to said second mentioned guide rail to cause such can while moving along said second mentioned guide rail to come into contact with said magnet, whereby said magnet, by restraining a contacted can from further travel along said conveyor, will cause the contacted can to be turned onto said slide, a gate positioned near the top of said slide to prevent a can on said conveyor from moving off of said conveyor and down said slide when said gate is closed, means normally holding said gate closed, solenoid operated mechanism for opening said gate when said solenoid is energized, a control circuit and switch for said solenoid operated by said first mentioned can directing means so as to cause said control circuit and switch to be closed and said solenoid to be energized whenever said first mentioned can directing means is operated, a second circuit and control switch for said solenoid, said latter mentioned switch located adjacent said slide and said magnet, and a contact element for said latter mentioned switch so positioned as to be engaged by a can and close said latter mentioned switch when the can is in contact with said magnet, whereby to hold said gate open as long as a can is on said slide and in contact with said magnet.

7. In combination with a conveyor assembly of the character described for conveying cans and the like and having a guide rail extending along and above one side of said conveyor, a can slide leading off from the opposite side along said conveyor, a guide rail located above and on said opposite side of said conveyor and terminating at said slide, a stationary magnet located at the termination of said latter mentioned guide rail, said magnet being capable of exerting sufficient attraction when contacted by a can on said conveyor to halt the forward movement of said can, means for directing a can from said first mentioned guide rail to said second mentioned guide rail to cause such can while moving along said second mentioned guide rail to come into contact with said magnet, whereby said magnet, by restraining a contacted can from further travel along said conveyor, will cause the contacted can to be turned onto said slide, a gate positioned near the top of said slide to prevent a can on said conveyor from moving off of said conveyor and down said slide when said gate is closed, means normally holding said gate closed, solenoid operated mechanism for opening said gate when said solenoid is energized, a control circuit and switch for said solenoid operated by said first mentioned can directing means so as to cause said control circuit and switch to be closed and said solenoid to be energized whenever said first mentioned can directing means is operated, a second circuit and control switch for said solenoid, said latter mentioned switch located adjacent said slide and said magnet, a contact element for said latter mentioned switch so positioned as to be engaged by a can and close said latter mentioned switch when the can is in contact with said magnet, whereby to hold said gate open as long as a can is on said slide and in contact with said magnet, an additional circuit and control switch for said solenoid, said additional control switch mounted on said gate, and a contact element for said additional control switch extending from the end of said gate so as to contact a can and close said addditional control switch to energize said solenoid should said gate attempt to close against a can on said slide.

References Cited in the file of this patent

UNITED STATES PATENTS

| | | |
|---|---|---|
| 1,263,146 | Taliaferro | Apr. 16, 1918 |
| 1,476,023 | Phelps | Dec. 4, 1923 |
| 2,649,184 | Dodge | Aug. 18, 1953 |